United States Patent
Kledzik

(10) Patent No.: US 11,945,417 B1
(45) Date of Patent: Apr. 2, 2024

(54) REEL COMPATIBLE MULTI-CHUCK AIR HOSE

(71) Applicant: Ryan Kledzik, Spring Valley, CA (US)

(72) Inventor: Ryan Kledzik, Spring Valley, CA (US)

( * ) Notice: Subject to any disclaimer, the term of this patent is extended or adjusted under 35 U.S.C. 154(b) by 0 days.

(21) Appl. No.: 18/224,850

(22) Filed: Jul. 21, 2023

(51) Int. Cl.
| | |
|---|---|
| *B60S 5/04* | (2006.01) |
| *B60C 29/06* | (2006.01) |
| *B65H 75/38* | (2006.01) |
| *F16L 11/22* | (2006.01) |
| *F16L 31/02* | (2006.01) |
| *F16L 47/32* | (2006.01) |
| *B65H 75/42* | (2006.01) |
| *F16L 3/00* | (2006.01) |
| *F16L 3/01* | (2006.01) |
| *F16L 39/02* | (2006.01) |

(52) U.S. Cl.
CPC .............. *B60S 5/04* (2013.01); *B60C 29/064* (2013.01); *F16L 11/22* (2013.01); *F16L 31/02* (2013.01); *F16L 47/32* (2013.01); *B65H 75/38* (2013.01); *B65H 75/425* (2013.01); *F16L 3/003* (2013.01); *F16L 3/012* (2013.01); *F16L 39/02* (2013.01)

(58) Field of Classification Search
CPC ........ A61M 39/20; B60C 29/064; B60S 5/04; B60S 5/043; B60S 5/046; F16L 3/003; F16L 3/01; F16L 3/012; F16L 11/121; F16L 11/22; F16L 31/02; F16L 37/008; F16L 39/02; F16L 47/32
USPC ........... 141/38, 237, 243; 152/415; 222/530; 248/89; 285/23, 131.1, 132.1
See application file for complete search history.

(56) References Cited

U.S. PATENT DOCUMENTS

| | | | | | |
|---|---|---|---|---|---|
| 1,339,785 | A | * | 5/1920 | Perrine | B65H 75/40 |
| | | | | | 137/355.27 |
| 1,559,470 | A | * | 10/1925 | Stewart | F16L 3/00 |
| | | | | | 24/1 |
| 3,412,760 | A | * | 11/1968 | Franck | F16L 3/01 |
| | | | | | 248/89 |
| 4,037,638 | A | * | 7/1977 | Mosca | B60C 29/064 |
| | | | | | 141/38 |
| 4,997,213 | A | * | 3/1991 | Traner | F16L 31/02 |
| | | | | | 285/915 |
| 5,879,029 | A | * | 3/1999 | Wilks | F16L 11/121 |
| | | | | | 285/23 |
| 5,983,947 | A | * | 11/1999 | Utterberg | B01D 19/0042 |
| | | | | | 138/109 |
| 6,789,564 | B1 | * | 9/2004 | Wu | F16L 3/012 |
| | | | | | 137/315.01 |

(Continued)

FOREIGN PATENT DOCUMENTS

GB    2393939 A  *  4/2004  ........... B60C 29/064

*Primary Examiner* — Robert K Arundale
*Assistant Examiner* — Richard K. Durden
(74) *Attorney, Agent, or Firm* — Pharar Patents & Intellectual Property; Andrew A. Pharar

(57) ABSTRACT

The reel compatible multi-chuck air hose may allow a user to simultaneously inflate multiple tires while providing a lighter and easily stored form factor. The reel compatible multi-chuck air hose may provide four air chucks in series, as opposed to in parallel, with an air source connector at its first end, instead of in the middle of the line. Each of the four air chucks may be connected to the primary hose by a T-connector and may be stored within a dock to keep the air chuck in line with the primary hose. By this design the reel compatible multi-chuck air hose can be rolled around a storage reel for easy storage.

4 Claims, 11 Drawing Sheets

(56) References Cited

U.S. PATENT DOCUMENTS

| | | | | |
|---|---|---|---|---|
| 9,795,736 | B2* | 10/2017 | Okiyama | A61M 39/10 |
| 10,518,025 | B2* | 12/2019 | Fukuoka | A61M 39/28 |
| 10,859,186 | B2* | 12/2020 | Angus | F16L 57/005 |
| 2012/0007730 | A1* | 1/2012 | Vecht-Lifshitz | B60S 5/046 |
| | | | | 340/442 |
| 2018/0319231 | A1* | 11/2018 | Zimmerman | B60C 29/064 |
| 2019/0263362 | A1* | 8/2019 | Hammer | B60C 29/064 |

* cited by examiner

REEL COMPATIBLE MULTI-CHUCK AIR HOSE

TECHNICAL FIELD OF THE INVENTION

The present invention relates in general to air hose devices, and, more specifically, to a reel compatible multi-chuck air hose.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Air hose couplers have been widely used in various industrial applications to facilitate the supply of compressed air from one hose to another or to pneumatic tools and equipment. These couplers typically feature male and female ends that securely join together, creating an airtight seal to maintain air pressure during operation. They are essential components in industries such as automotive, construction, manufacturing, and more, where compressed air is required for powering tools, machines, and other processes.

Air chucks play a crucial role in the automotive industry and various other sectors where tires are commonly used, such as transportation, aviation, and construction. These devices are designed to inflate and maintain optimal air pressure in tires, ensuring safe and efficient vehicle operation and extending tire lifespan. Additionally, tire inflation devices find applications in sports facilities, industrial equipment, and consumer goods, where inflation of inflatable objects is required.

The activity of off-roading involves the driving of high clearance, four-wheel drive vehicles over unpaved, uneven, and, often, rough terrain. During such activities most users find it advantageous to lower the air pressure in their tires to provide improved ground contact and traction. Once returning to a paved road, these users must then reinflate their tires for safety and to reduce drag. To reinflate their tires such users will often have a source of compressed air on or within their vehicles, which they connect to each tire with one or more air hoses and air chucks for air transfer.

A few solutions exist to aid users in inflating their tires simultaneously. One solution known in the art, which is called the Morrflate® device, comprises a central T-connector that is connected to an air source. The central connecter has a first and second air hose extending out to either side of the vehicle to a second and third T-connecter, which themselves connect to a third, fourth, fifth, and sixth air hose. At the ends of these four latter hoses are air chucks, which are then connected to one each of the four tires of the vehicle for simultaneous inflation.

A second solution known in the art is called the EZ Flate® device, which also comprises a central T-connector that is connected to an air source. The central connector has a first and second air hose extending out to either side of the vehicle to a second and third T-connecter. Here, though, the second and third T-connectors connect to a first air chuck and a third hose and a second air chuck and a fourth hose, respectively. The third hose and fourth hose each have an additional air chuck on their furthest ends.

The problems inherent in these two devices are their bulk, weight, and form factor. The extensive length of the multiple hoses and the use of multiple connectors makes the systems heavy. The use of the large T-connectors also makes the systems difficult to roll down or package for storage. Neither of these systems can be stored on a reel, either, because the central T-connector prevents the hoses from be wound around such a storage device.

Thus, there is a need in the art for a reel compatible multi-chuck air hose that may allow a user to simultaneously inflate multiple tires while providing a lighter and easily stored form factor. The reel compatible multi-chuck air hose may provide four air chucks in series, as opposed to in parallel, with an air source connector at its first end, instead of in the middle of the line. Each of the four air chucks may be connected to the primary hose by a T-connector and may be stored within a dock to keep the air chuck in line with the primary hose. By this design the reel compatible multi-chuck air hose can be rolled around a storage reel for easy storage. It is to these ends that the present invention has been developed.

BRIEF SUMMARY OF THE INVENTION

To minimize the limitations in the prior art, and to minimize other limitations that will be apparent upon reading and understanding the present specification, the present invention describes a reel compatible multi-chuck air hose.

It is an objective of the present invention to provide a reel compatible multi-chuck air hose that may comprise a splitter.

It is another objective of the present invention to provide a reel compatible multi-chuck air hose that may comprise a splitter inlet.

It is another objective of the present invention to provide a reel compatible multi-chuck air hose that may comprise an air chuck outlet.

It is another objective of the present invention to provide a reel compatible multi-chuck air hose that may comprise an air hose outlet.

It is another objective of the present invention to provide a reel compatible multi-chuck air hose that may comprise a dock.

It is another objective of the present invention to provide a reel compatible multi-chuck air hose that may comprise an air hose channel.

It is another objective of the present invention to provide a reel compatible multi-chuck air hose that may comprise a dummy valve.

It is another objective of the present invention to provide a reel compatible multi-chuck air hose that may comprise an air chuck.

It is another objective of the present invention to provide a reel compatible multi-chuck air hose that may comprise a valve receiver.

It is another objective of the present invention to provide a reel compatible multi-chuck air hose that may comprise an air chuck lock.

It is another objective of the present invention to provide a reel compatible multi-chuck air hose that may comprise a chuck inlet.

It is another objective of the present invention to provide a reel compatible multi-chuck air hose that may comprise a hose.

It is another objective of the present invention to provide a reel compatible multi-chuck air hose that may comprise an air source adapter.

It is another objective of the present invention to provide a reel compatible multi-chuck air hose that may comprise a hose reel.

It is another objective of the present invention to provide a reel compatible multi-chuck air hose that may comprise a resilient material of construction.

It is another objective of the present invention to provide a reel compatible multi-chuck air hose that may comprise a water-proof material of construction.

It is another objective of the present invention to provide a reel compatible multi-chuck air hose that may comprise a reusable material of construction.

It is another objective of the present invention to provide a reel compatible multi-chuck air hose that may comprise a washable material of construction.

It is another objective of the present invention to provide a reel compatible multi-chuck air hose that may comprise a multi-component construction.

It is another objective of the present invention to provide a reel compatible multi-chuck air hose that may comprise an antimicrobial layer.

It is another objective of the present invention to provide a reel compatible multi-chuck air hose that may comprise an antimicrobial material of construction.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

DETAILED DESCRIPTION OF THE INVENTION

Certain terminology is used in the following description for reference only and is not limiting. The words "front," "rear," "anterior," "posterior," "lateral," "medial," "upper," "lower," "outer," "inner," and "interior" refer to directions toward and away from, respectively, the geometric center of the invention, and designated parts thereof, in accordance with the present disclosure. Unless specifically set forth herein, the terms "a," "an," and "the" are not limited to one element, but instead should be read as meaning "at least one." The terminology includes the words noted above, derivatives thereof, and words of similar import.

The reel compatible multi-chuck air hose may allow a user to simultaneously inflate multiple tires while providing a lighter and easily stored form factor. The reel compatible multi-chuck air hose may provide four air chucks in series, as opposed to in parallel, with an air source connector at its first end, instead of in the middle of the line. Each of the four air chucks may be connected to the primary hose by a T-connector and may be stored within a dock to keep the air chuck in line with the primary hose. By this design the reel compatible multi-chuck air hose can be rolled around a storage reel for easy storage.

Figure 1:
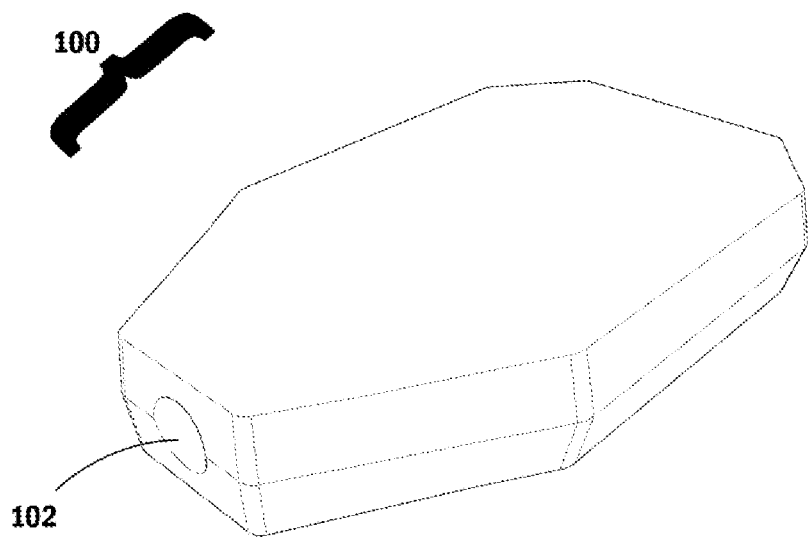
FIG. 1 is a front isometric perspective view of a splitter of a reel compatible multi-chuck air hose, as contemplated by the present disclosure.
Figure 2:
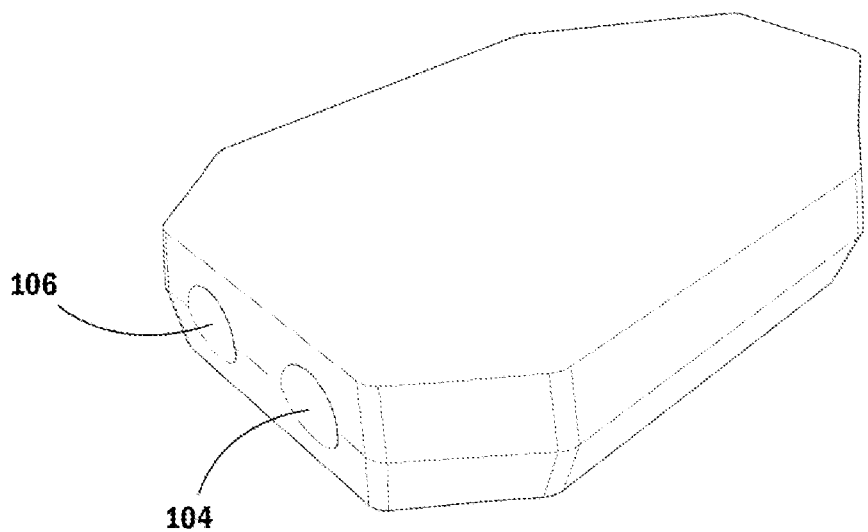
FIG. 2 is a rear isometric perspective view of a splitter of a reel compatible multi-chuck air hose, as contemplated by the present disclosure.
Figure 3:
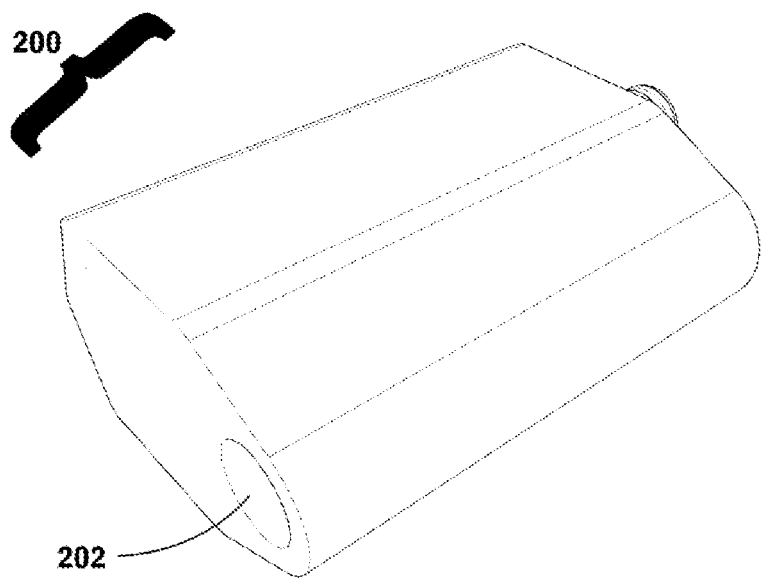
FIG. 3 is a front isometric perspective view of a dock of a reel compatible multi-chuck air hose, as contemplated by the present disclosure.
Figure 4:
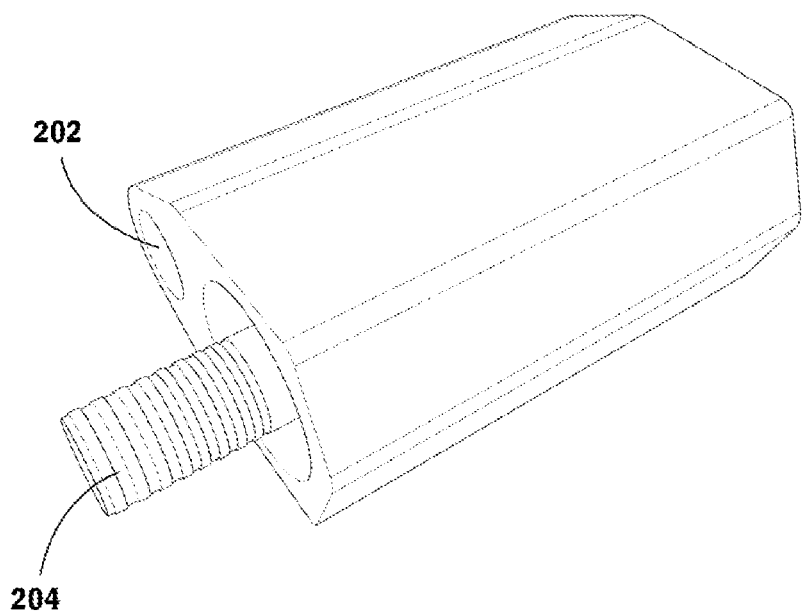
FIG. 4 is a rear isometric perspective view of a dock of a reel compatible multi-chuck air hose, as contemplated by the present disclosure.
Figure 5:
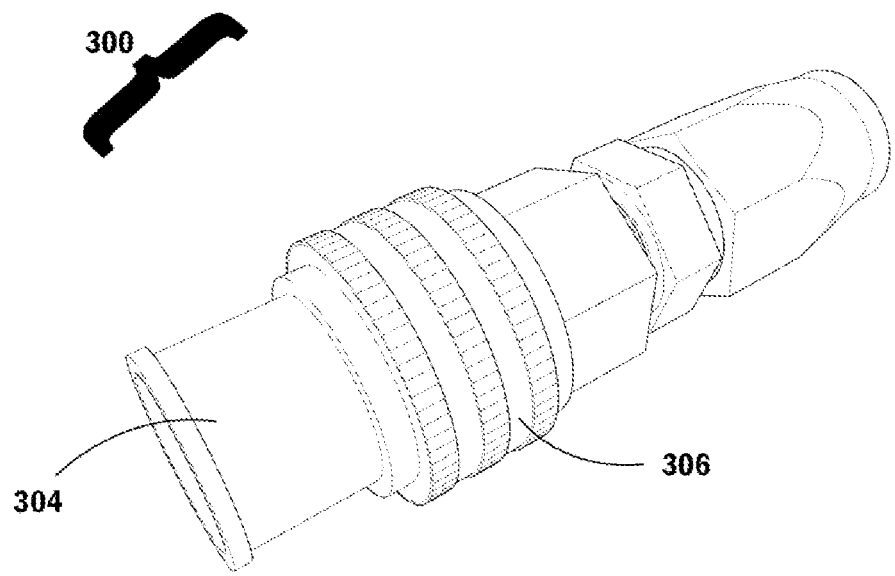
FIG. 5 is a front isometric perspective view of an air chuck of a reel compatible multi-chuck air hose, as contemplated by the present disclosure.
Figure 6:
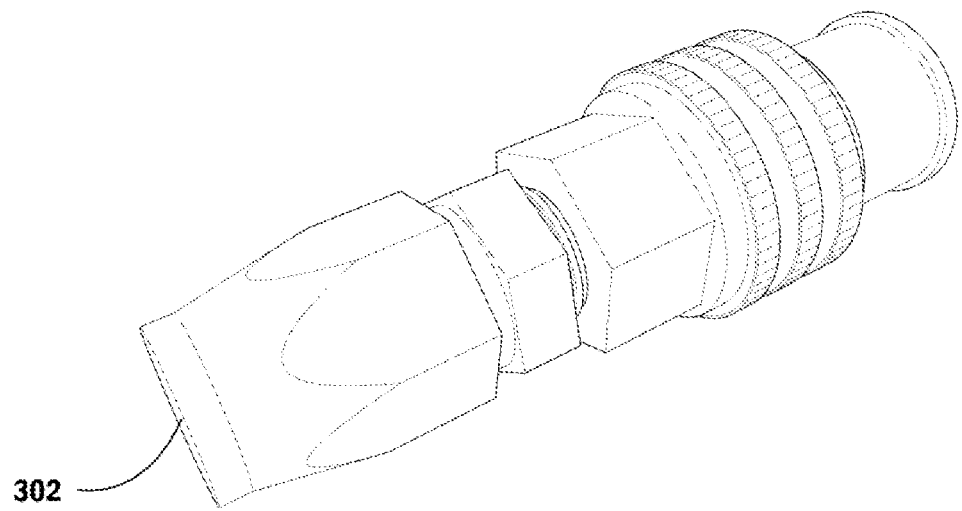
FIG. 6 is a rear isometric perspective view of an air chuck of a reel compatible multi-chuck air hose, as contemplated by the present disclosure.
Figure 7:
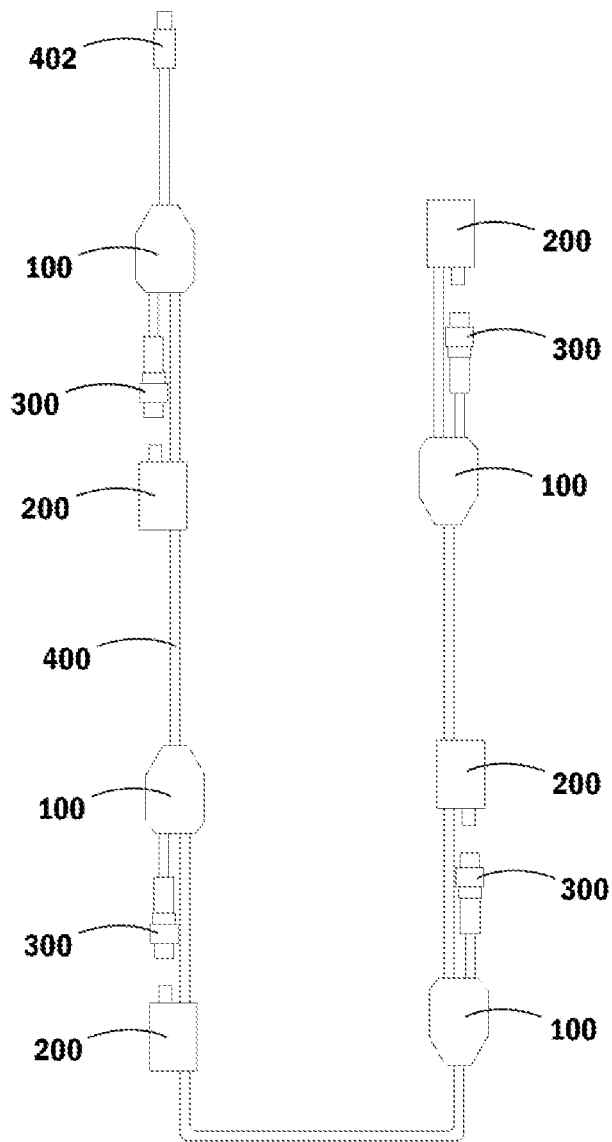
FIG. 7 is a schematic view of a reel compatible multi-chuck air hose, as contemplated by the present disclosure.
Figure 8:
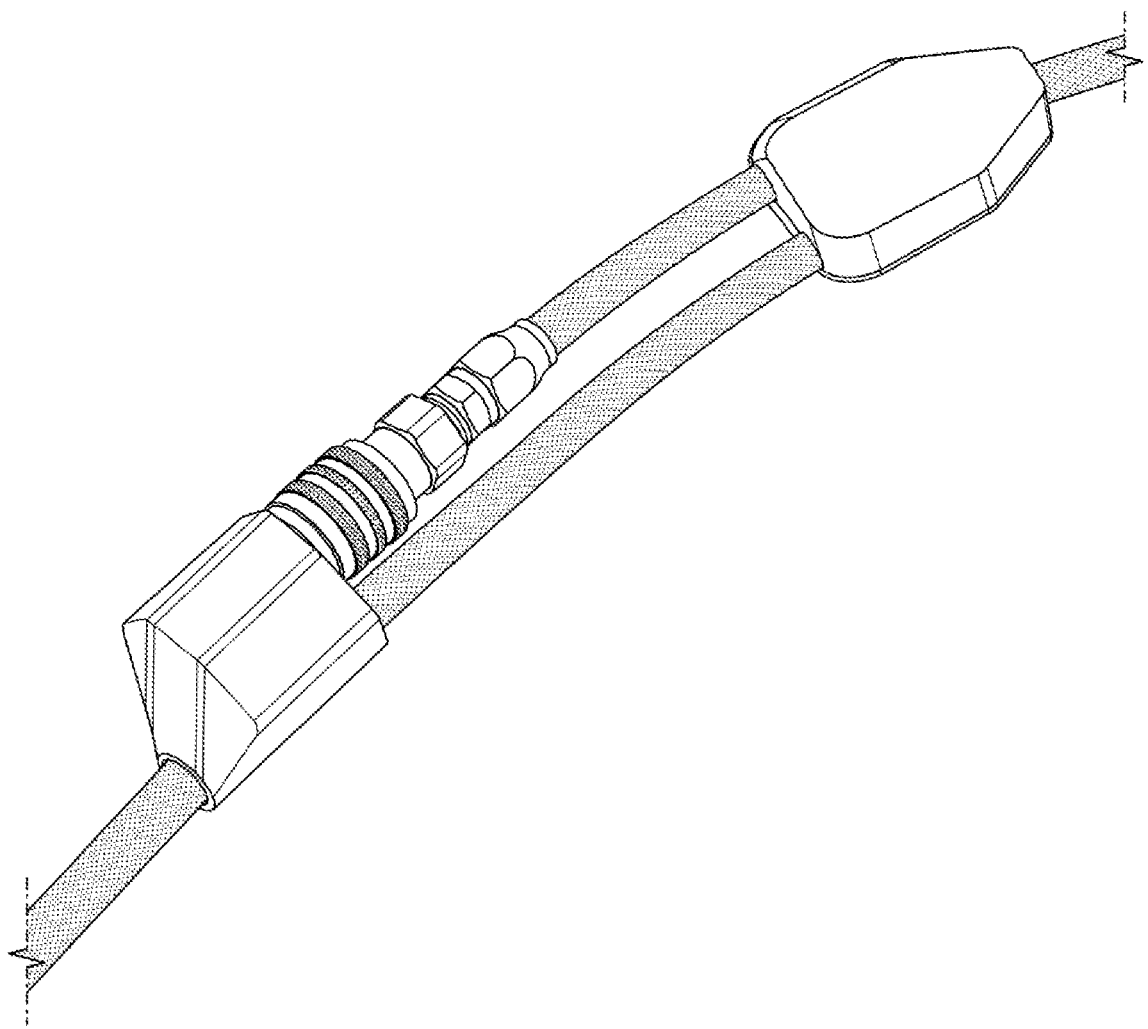
FIG. 8 is an overall view of a reel compatible multi-chuck air hose in a storable orientation, as contemplated by the present disclosure.
Figure 9:
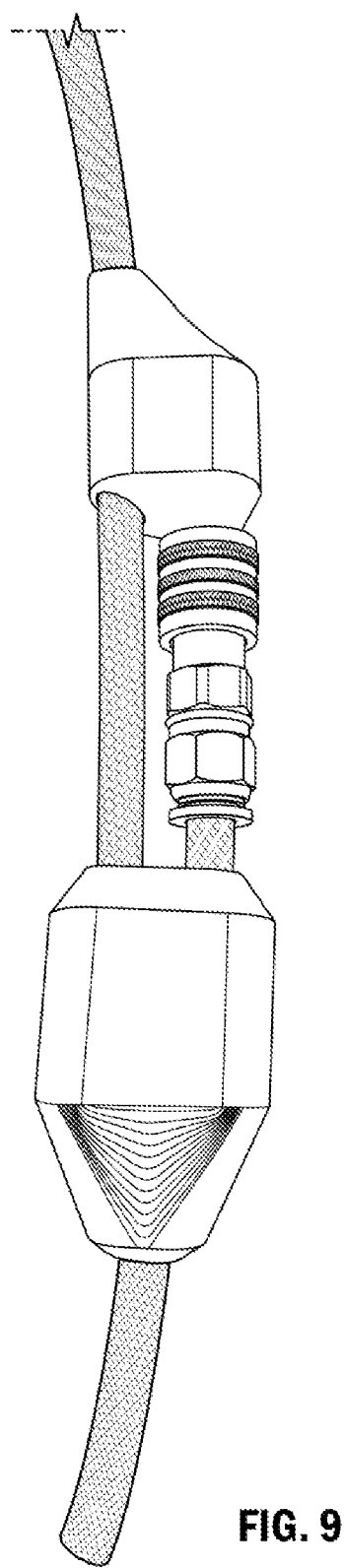
FIG. 9 is an overall view of a reel compatible multi-chuck air hose in a storable orientation, as contemplated by the present disclosure.
Figure 10:
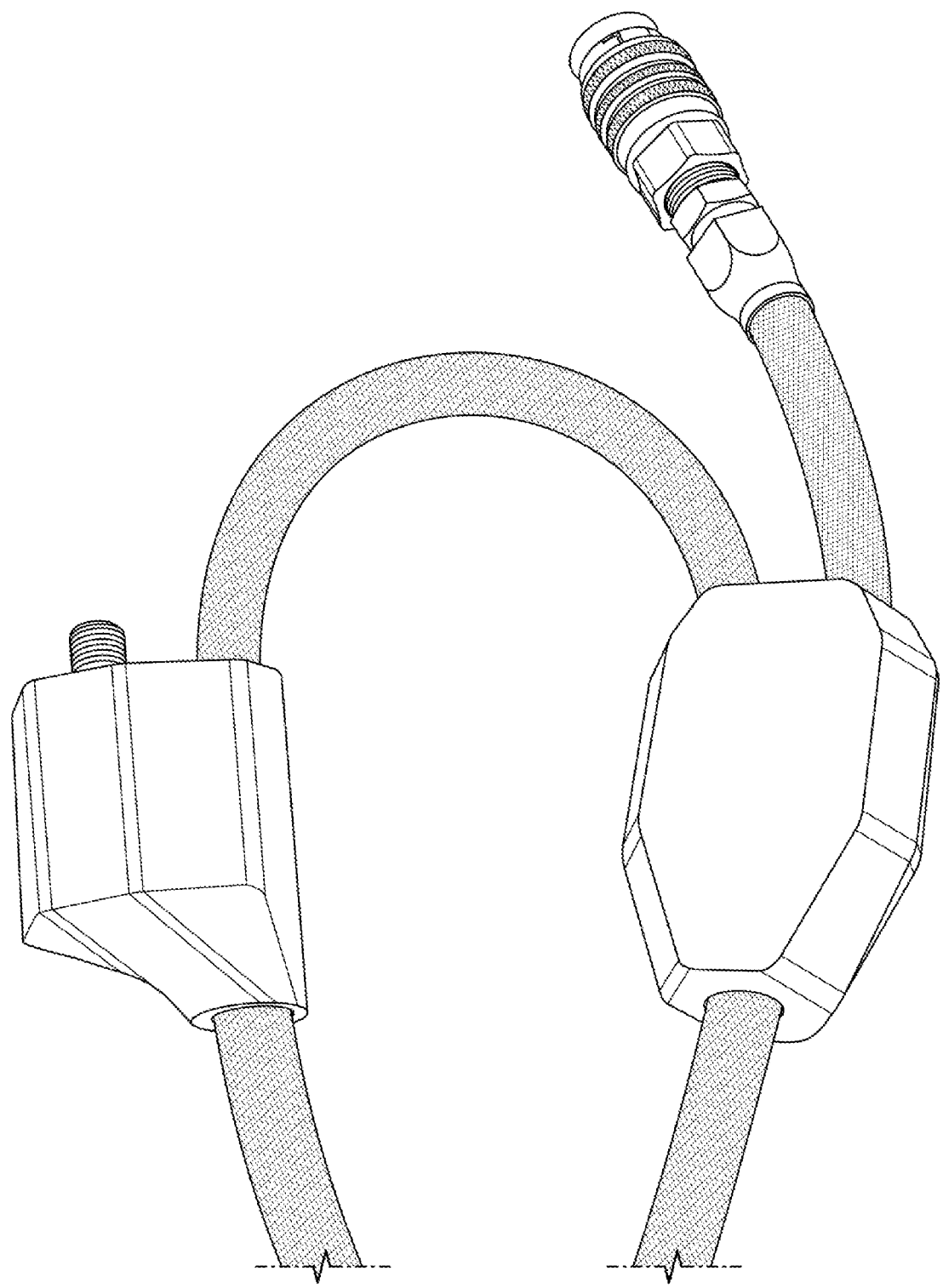
FIG. 10 is an overall view of a reel compatible multi-chuck air hose in a usable orientation, as contemplated by the present disclosure.
Figure 11:
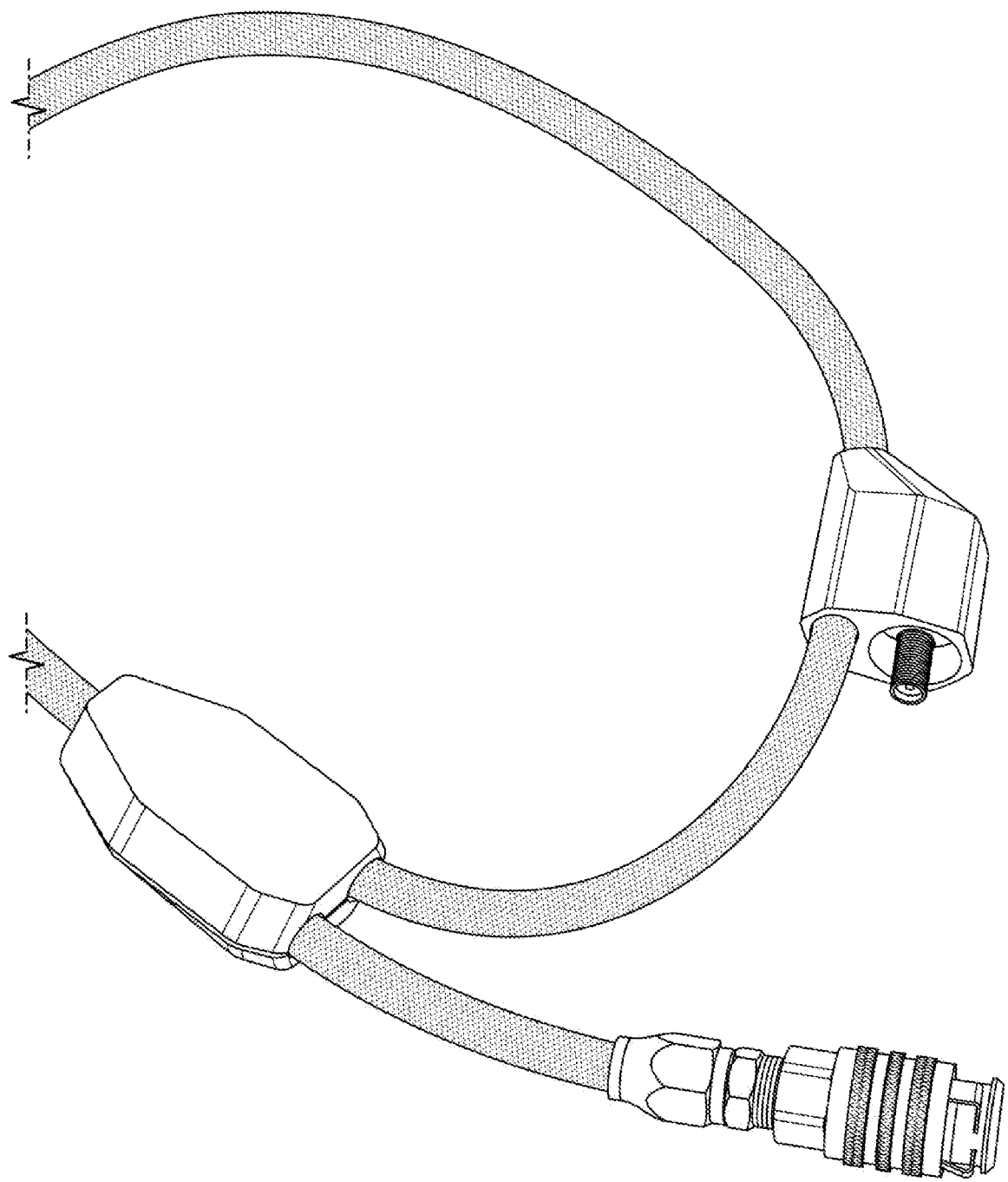
FIG. 11 is an overall view of a reel compatible multi-chuck air hose in a usable orientation, as contemplated by the present disclosure.
Figure 12:
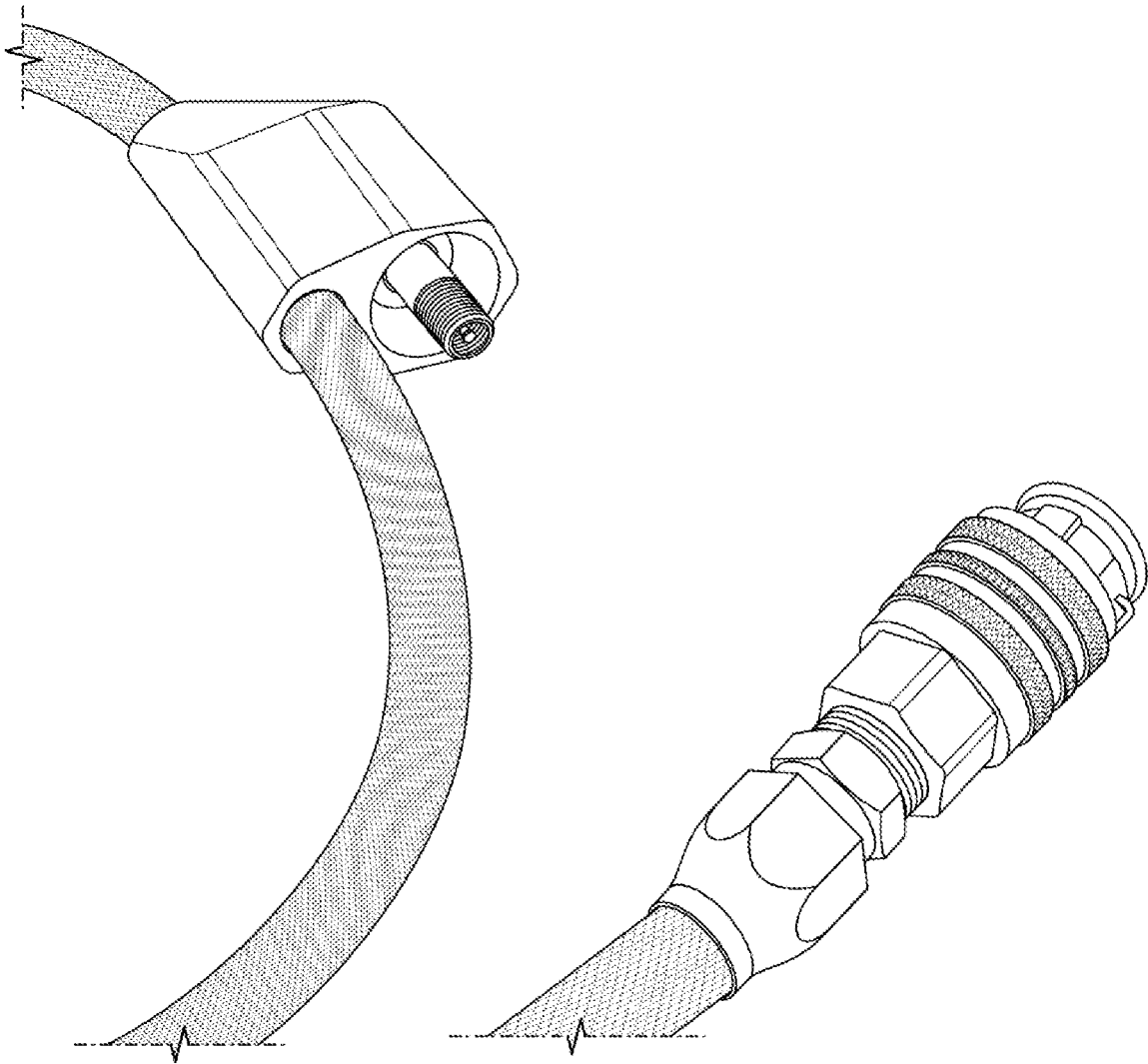
FIG. 12 is an overall view of a reel compatible multi-chuck air hose showing the relationship between an air chuck and a dock, as contemplated by the present disclosure.
Figure 13:
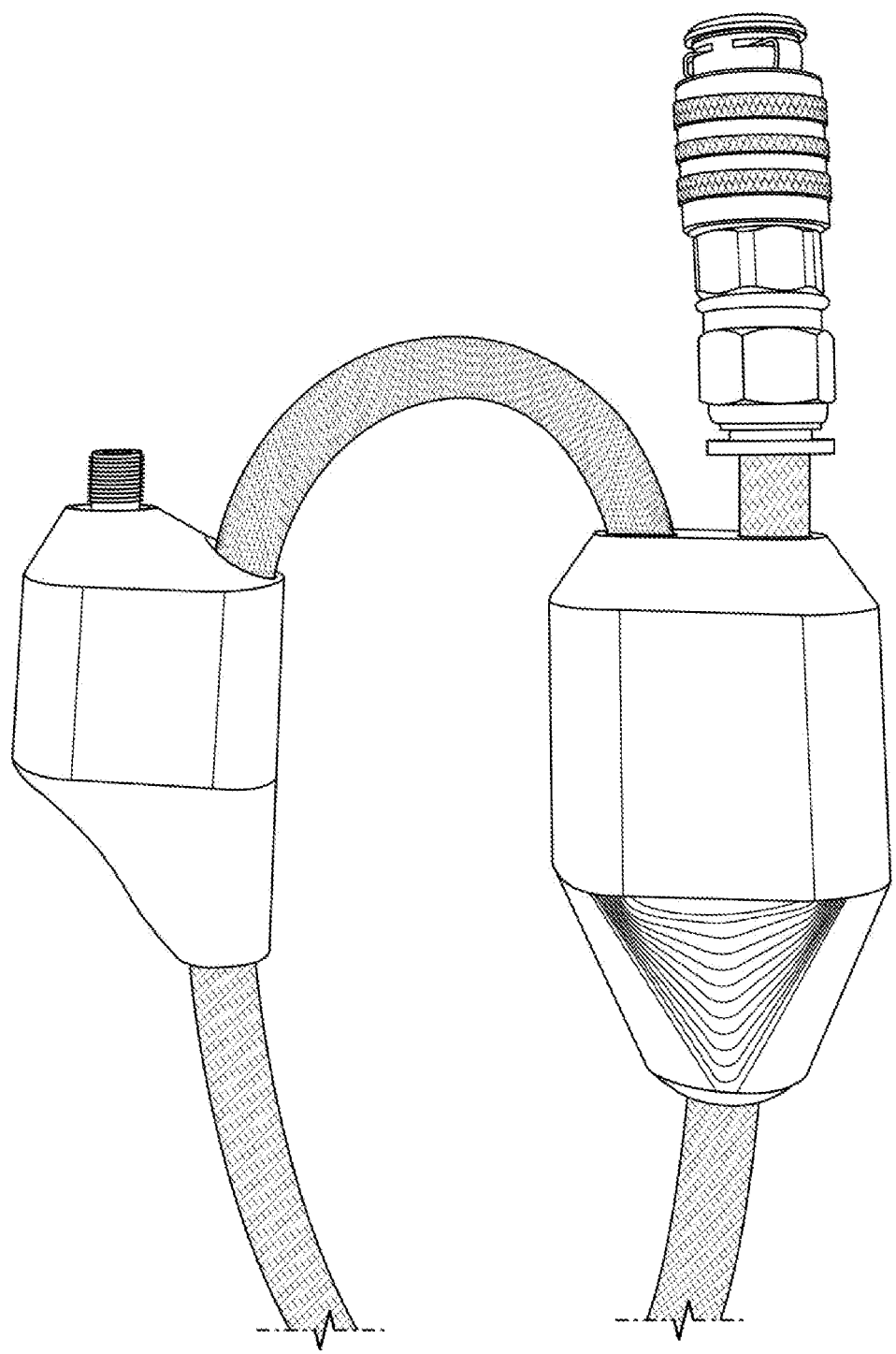
FIG. 13 is an overall view of a reel compatible multi-chuck air hose in a usable orientation, as contemplated by the present disclosure.
Figure 14:
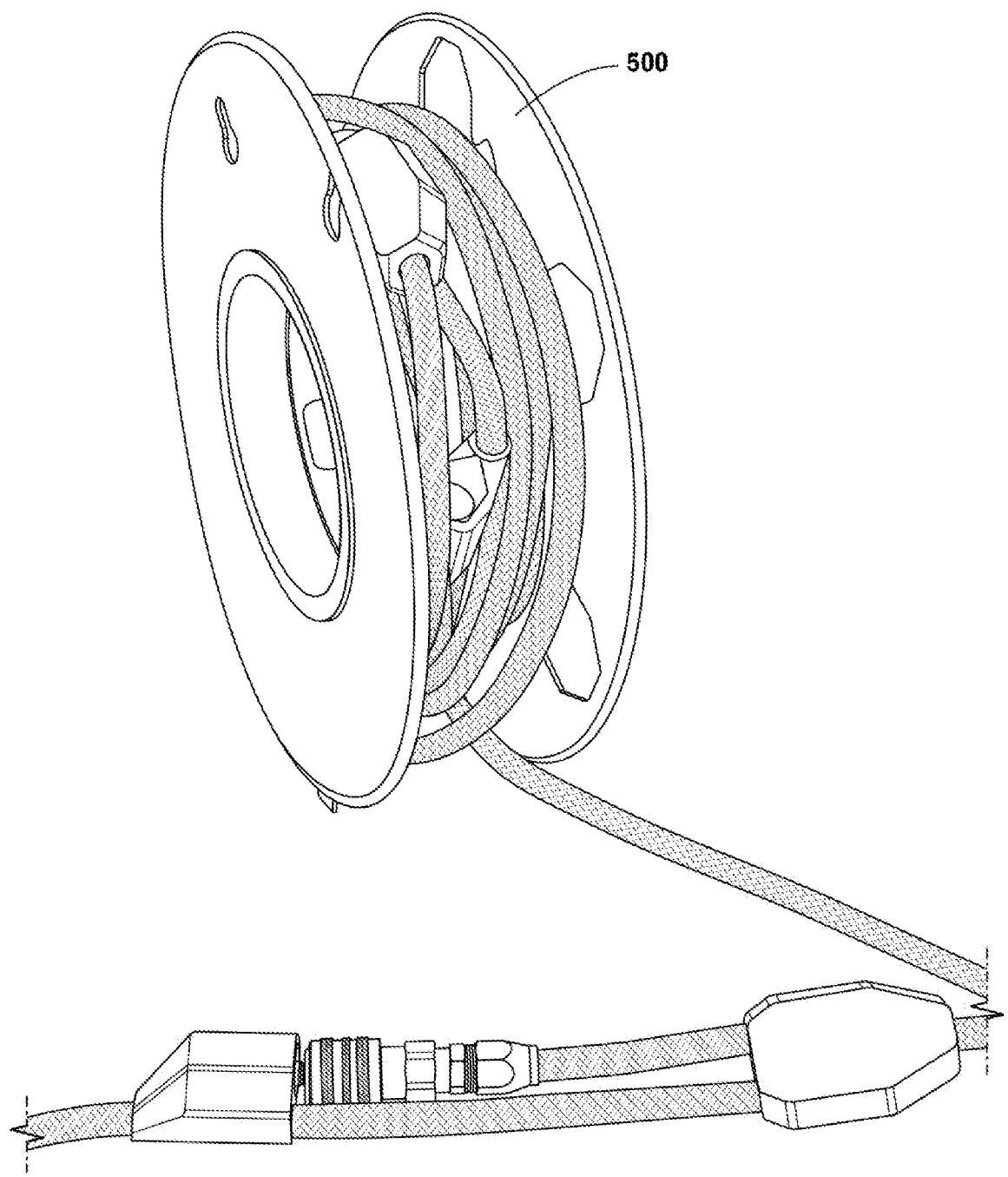
FIG. 14 is an overall view of a reel compatible multi-chuck air hose installed on a storage reel, as contemplated by the present disclosure.

The illustrations of FIGS. 1-14 illustrate a reel compatible multi-chuck air hose, as contemplated by the present disclosure. The device may comprise, generally, a splitter 100, a dock 200, an air chuck 300, and an air hose 400.

The splitter 100 may comprise any appropriate splitter designed to receive a single air hose and divide the flow of air into two separate air hoses. The splitter 100 may comprise a splitter inlet 102, into which an air hose 400 may enter. Within the body of the splitter 100 the air hose 400 may be divided into two separate paths of air flow. The splitter 100 may further comprise an air hose outlet 104 and an air chuck outlet 106. The two separate paths of the air hose 400 may exit from one each of these outlets.

The splitter 100 acts as a support structure for the air hose 400 and the air chuck 300, while also providing for the ability of the device to be wound around a hose reel 500. The splitting of the two paths of the air hose 400 within the splitter 100 may be done by any appropriate means such as, for example, utilizing a T-junction, Y-junction, or the combining of three air hoses into a Y-junction. The splitting of the air paths may be entirely contained within a main body of the splitter 100 so as to reinforce the splitting and to provide a housing that is amenable to being wound around a hose reel 500 without causing binding or interference with other components in the device.

The dock 200 may comprise any appropriate dock designed to receive an air chuck. The dock 200 may further comprise an air hose channel 202, through which a single air hose 400 may pass, and a dummy valve 204, which may be parallel to the air hose channel. The dummy valve 204 may comprise any valve appropriate to emulating a standard tire valve stem.

The dock 200 acts as a support structure for the air hose 400 and the air chuck 300, while also providing for the ability of the device to be wound around a hose reel 500. The dock 200 allows for the air hose 400 to pass through, or terminate within, a main body of the dock 200, while also allowing for the air chuck 300 to be attached to the dummy valve 204 of the dock 200. By this configuration the air chuck 300 is kept parallel to the air hose 400 when in a storable configuration, allowing for the device to being wound around a hose reel 500 without causing binding or interference with other components in the device.

The air chuck 300 may comprise any appropriate air chuck designed to be attached to the end of an air hose to deliver air into a tire valve. The air chuck 300 may further comprise a chuck inlet 302, a valve receiver 304, and a chuck lock 306. The path of air may flow through the air chuck 300 from the chuck inlet 302 to the valve receiver 304 into a standard tire valve, and the chuck lock 306 may be manipulated to lock the air chuck 300 to a standard tire valve.

The air chuck 300 acts as a mechanism for delivering compressed air from the air hose 400 to a vehicle tire. The air chuck 300 may be reversibly attached to the dummy valve 204 of the dock 200 when the device is in a storable configuration, and may be disconnected from the dummy valve 204 or connected to a standard tire valve when the device is in a usable configuration. The purpose of attaching the valve receiver 304 of the air chuck 300 to the dummy valve 204 of the dock 200 is to ensure that the splitter 100, dock 200, and air chuck 300 are in a relatively parallel orientation that is amenable to allowing for the device to being wound around a hose reel 500 without causing binding or interference with other components in the device.

In one embodiment the reel compatible multi-chuck air hose may comprise a plurality of splitters 100, a plurality of docks 200, and a plurality of air chucks 300. In one embodiment of the reel compatible multi-chuck air hose, the splitter 100, the dock 200, and the air chuck 300 may comprise an intermediate air supply unit, wherein the air hose 400 passes through the dock 200, or a terminal air supply unit, wherein the air hose 400 terminates within the dock 200. The reel compatible multi-chuck air hose may comprise a plurality of intermediate air supply units and a single terminal air supply unit.

The air hose 400 may comprise any hose appropriate for delivering pressurized air from an air source to an inflatable object. Air hoses are made available in a variety of materials and sizes, and are commonly available as straight hoses or recoil hoses. Such hoses are made most commonly of rubber, polyurethane, or polyvinyl chloride, and are often manufactured with anti-corrosion and abrasion-resistant materials.

In one embodiment of the reel compatible multi-chuck air hose, the air hose 400 may comprise a first end, a length, and a second end. The first end of the air hose 400 may be attached to an air source connecter 402, which may comprise any appropriate connector or adapter known in the art suitable for connecting an air hose to a pressurized air source.

To begin using the device a user may first install the air source connector 402 to a compressed air source. The user may then disconnect each of the plurality of air chucks 300 from one each of their respective plurality of docks 200. In this way the user converts the reel compatible multi-chuck air hose into a usable orientation. The user may then connect one each of the air chucks 300 to a standard vehicle tire valve, and may then begin the flow of air from the compressed air source to inflate their tires.

To continue using the device once suitable tire air inflation has been achieved the user may then disconnect one each of the plurality of air chucks 300 from their respective vehicle tire valves and reconnect one each of the plurality of air chucks 300 to their respective plurality of docks 200. In this way the user returns the reel compatible multi-chuck air hose to a storable orientation. The user may then wind the reel compatible multi-chuck air hose around a hose reel 500 for easy storage.

The reel compatible multi-chuck air hose may be substantially constructed of any suitable material or combination of materials, but typically is constructed of a resilient material or combination of materials such that the device is resistant to damage as a result of compression, twisting, heating, or submersion in water. As an example, and without limiting the scope of the present invention, various exemplary embodiments of the reel compatible multi-chuck air hose may be substantially constructed of one or more materials of steel, aluminum, brass, fiberglass, carbon fiber, plastic, acrylic, polycarbonate, polyester, nylon, denim, cotton, silicone, or combinations thereof. In some embodiments the various components of the device may be coated, lined, or otherwise insulated to prevent contamination of the device. In one embodiment the material of construction may vary from one component to the next within the system.

In one embodiment the reel compatible multi-chuck air hose may comprise a resilient material of construction that either comprises a material having antimicrobial properties or comprises a layering of antimicrobial material or coating. Antimicrobial properties comprise the characteristic of being antibacterial, biocidal, microbicidal, anti-fungal, anti-viral, or other similar characteristics, and the oligodynamic effect, which is possessed by copper, brass, silver, gold, and several other metals and alloys, is one such characteristic. Copper and its alloys, in particular, have exceptional self-sanitizing effects. Silver also has this effect, and is less toxic to users than copper. Some materials, such as silver in its metallic form, may require the presence of moisture to activate the antimicrobial properties.

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims.

I claim:

1. A reel compatible multi-chuck air hose assembly, comprising:
   a splitter;
   a dock;
   an air chuck; and
   an air hose;

wherein said air hose comprises a plurality of hose sections each having a first end and a second end;

wherein said splitter further comprises a splitter inlet, an air chuck outlet, and an air hose outlet;

wherein said dock further comprises an air hose channel and a dummy valve;

wherein said air chuck further comprises an air chuck inlet, a valve receiver, and an air chuck lock;

wherein a second end of a first of said plurality of hose sections is attached to said splitter inlet;

wherein a first end of a second of said plurality of hose sections is attached to said air hose outlet;

wherein said second of said plurality of hose sections passes through said air hose channel;

wherein a first end of a third of said plurality of hose sections is attached to said air chuck outlet;

wherein a second end of said third of said plurality of hose sections is attached to said air chuck inlet; and wherein said valve receiver is attachable to said dummy valve.

2. A reel compatible multi-chuck air hose assembly, comprising:

a plurality of intermediate air supply units;
a terminal air supply unit; and
an air hose;

wherein each of said plurality of intermediate air supply units comprises a splitter, a dock, and an air chuck;

wherein said terminal air supply unit comprises a splitter, a dock, and an air chuck;

wherein said air hose comprises a plurality of hose sections each having a first end and a second end;

wherein each splitter further comprises a splitter inlet, an air chuck outlet, and an air hose outlet;

wherein each dock further comprises an air hose channel and a dummy valve;

wherein each air chuck further comprises an air chuck inlet, a valve receiver, and an air chuck lock;

wherein, for each of said intermediate air supply units and said terminal air supply unit, said valve receiver thereof is attachable to said dummy valve thereof;

wherein a second end of a first of said plurality of hose sections is attached to said splitter inlet of a first of said intermediate air supply units;

wherein a first end of a second of said plurality of hose sections is attached to said air hose outlet of said first of said intermediate air supply units;

wherein said second of said plurality of hose sections passes through said air hose channel of said first of said intermediate air supply units;

wherein a first end of a third of said plurality of hose sections is attached to said air chuck outlet of said first of said intermediate air supply units;

wherein a second end of said third of said plurality of hose sections is attached to said air chuck inlet of said first of said intermediate air supply units;

wherein a second end of said second of said plurality of hose sections is attached to said splitter inlet of a second of said intermediate air supply units;

wherein a first end of a fourth of said plurality of hose sections is attached to said air hose outlet of said second of said intermediate air supply units;

wherein said fourth of said plurality of hose sections passes through said air hose channel of said second of said intermediate air supply units;

wherein a first end of a fifth of said plurality of hose sections is attached to said air chuck outlet of said second of said intermediate air supply units;

wherein a second end of said fifth of said plurality of hose sections is attached to said air chuck inlet of said second of said intermediate air supply units;

wherein a second end of said fourth of said plurality of hose sections is attached to said splitter inlet of a third of said intermediate air supply units;

wherein a first end of a sixth of said plurality of hose sections is attached to said air hose outlet of said third of said intermediate air supply units;

wherein said sixth of said plurality of hose sections passes through said air hose channel of said third of said intermediate air supply units;

wherein a first end of a seventh of said plurality of hose sections is attached to said air chuck outlet of said third of said intermediate air supply units;

wherein a second end of said seventh of said plurality of hose sections is attached to said air chuck inlet of said third of said intermediate air supply units;

wherein a second end of said sixth of said plurality of hose sections is attached to said splitter inlet of said terminal air supply unit;

wherein a first end of an eighth of said plurality of hose sections is attached to said air hose outlet of said terminal air supply unit;

wherein said eighth of said plurality of hose sections terminates within said air hose channel of said terminal air supply unit;

wherein a first end of a ninth of said plurality of hose sections is attached to said air chuck outlet of said terminal air supply unit; and wherein a second end of said ninth of said plurality of hose sections is attached to said air chuck inlet of said terminal air supply unit.

3. The reel compatible multi-chuck air hose assembly of claim 2, further comprising:

an air source connector;

wherein a first end of said first of said plurality of hose sections is attached to said air source connector.

4. A multi-chuck air hose system comprising:

the reel compatible multi-chuck air hose assembly of claim 3; and a hose reel;

wherein the reel compatible multi-chuck air hose assembly is wrappable around said hose reel.

* * * * *